(12) United States Patent
Mauro

(10) Patent No.: US 6,788,457 B2
(45) Date of Patent: Sep. 7, 2004

(54) MICROSCOPE STAGE

(76) Inventor: George Mauro, 26 Keewaydin Dr., Suite B, Salem, NH (US) 03079

( * ) Notice: Subject to any disclaimer, the term of this patent is extended or adjusted under 35 U.S.C. 154(b) by 0 days.

(21) Appl. No.: 10/159,932

(22) Filed: May 30, 2002

(65) Prior Publication Data

US 2003/0223110 A1 Dec. 4, 2003

(51) Int. Cl.[7] .............................................. G02B 21/26
(52) U.S. Cl. ........................ 359/392; 359/368; 359/391
(58) Field of Search .............................. 359/368, 900, 359/391–398; 74/490.06

(56) References Cited

U.S. PATENT DOCUMENTS

| 1,187,970 | A | | 6/1916 | Cobb ........................ 359/391 |
|---|---|---|---|---|
| 1,859,823 | A | * | 5/1932 | Fitz ............................. 359/391 |
| 4,262,991 | A | | 4/1981 | Wagener et al. ............ 359/391 |
| 4,652,095 | A | | 3/1987 | Mauro ........................ 359/391 |
| 4,872,077 | A | * | 10/1989 | Tezuka ..................... 360/267.1 |
| 5,228,357 | A | | 7/1993 | Dosaka ........................ 74/479 |
| 5,380,095 | A | * | 1/1995 | Pryor ............................. 384/8 |
| 6,266,184 | B1 | | 7/2001 | Mauro ........................ 359/393 |
| 6,373,627 | B1 | | 4/2002 | Mauro ........................ 359/393 |
| 6,504,648 | B2 | * | 1/2003 | Mauro ........................ 359/393 |

* cited by examiner

Primary Examiner—Thong Q. Nguyen
(74) Attorney, Agent, or Firm—Davis & Bujold, PLLC

(57) ABSTRACT

A microscope stage supported on a base for movement in a direction of travel relative to the base by a resiliently biased support and guide structure disposed adjacent one edge of the stage, an opposed edge of the stage being supported on the base without guidance.

10 Claims, 3 Drawing Sheets

MICROSCOPE STAGE

FIELD OF THE INVENTION

This invention relates to a microscope stage in which a stage is guided for movement along a single rail structure disposed adjacent one edge of the stage parallel to the direction of the movement.

BACKGROUND OF THE INVENTION

Microscope stages are well known in the prior art, for example, in U.S. Pat. No. 1,187,970, which discloses a stage with anti-friction wheels bearing on a surface of the microscope table, the stage having scales to record the position of the stage relative to the microscope table. The stage is also provided with a hold down spring to hold a slide against a flange of the microscope table. The stage of this prior art is not attached to the microscope table and requires being hand held in place for stability.

U.S. Pat. No. 4,262,991 provides a microscope stage displaceable in two coordinate directions with spring loaded guide means to maintain stage and base in captive alignment using a pair of parallel grooves and rails spaced apart by a substantial portion of the width of the stage. This arrangement, when a stage is wider than it is long results in too much friction when provided with opposing contact point preload sufficient to provide smooth, predictable and stable movement of the stage relative to the base.

The inventor of the present invention has been granted a number of United States Patents for component precision positioning stages for example, U.S. Pat. No. 6,266,184 which discloses a stage supported on opposite side edges by and for movement along a pair of rails engagement with which is by means of a spring bias. This arrangement is satisfactory when the width of the stage is narrower than its length in the direction of travel of the stage along the rails. However, when the width is greater than the length, twisting forces make it difficult or impossible, without excessive friction losses to maintain proper contact with the spaced rails. This results in jerky and/or imprecise movement of the stage.

OBJECTS OF THE INVENTION

It is an object of the present invention to provide a microscope stage which provides smooth low friction predictable and stable sliding movement relative to a base which may be affixed to or part of a microscope table, particularly when the stage is shorter along its direction of movement than its width normal to that direction.

It is a further object of the invention to provide a microscope stage guided and supported by a single support and guide structure.

SUMMARY OF THE INVENTION

The invention provides a microscope stage, supported on a base, for movement in a direction of travel relative to the base by a resiliently biased single support and guide structure, which are disposed adjacent an edge of the stage, an opposed edge of the stage being supported on the base.

According to the invention, there is provided a microscope stage, comprising: a stage supported on a base for movement relative to the base in a direction of travel, the stage having opposed parallel edges extending in the direction of travel, and extending between opposed ends of the stage; the stage and base together define a single stage support and guide structure disposed adjacent one of the edge of the stage, the structure including a rail extending along the direction of travel and engaged by a guide for guiding the stage along the rail in the direction of travel, wherein the rail and guide are biased into contact with each other by a spring device and wherein the stage is supported by the base adjacent the other of the edges of the stage.

The invention is particularly applicable to microscope stages defined in the preceding paragraph in which the length of the parallel edges is less than the length of the opposed ends (e.g. the width of the stage).

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
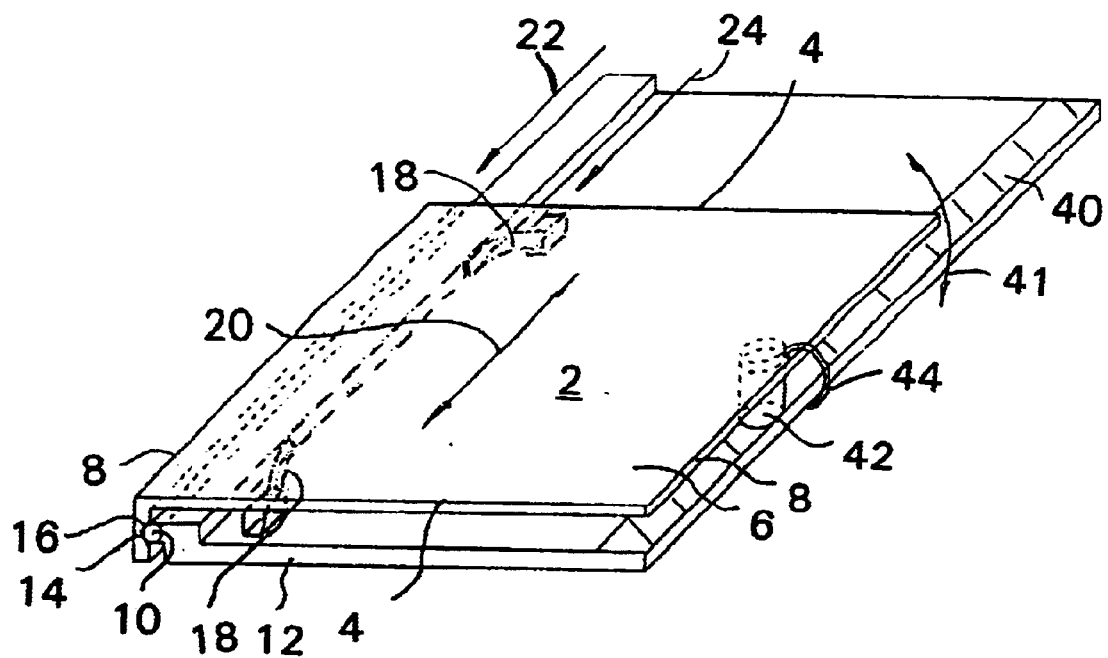
FIG. 1 is a diagrammatic perspective view of a microscope stage of the present invention.

Referring to FIG. 1 a rectangular microscope stage 2 has opposed ends 4 spaced apart by a planar surface 6 of the stage 2 and opposed parallel stage edges 8. Adjacent and parallel to one edge 8 of the stage is a support and guide rail 10 forming part of a base 12 comprising a rail face 14 engages a V-groove 16 formed in the stage. The rail face 14 is curved, preferably at least part circular in order to be held captive by the V-groove 16 under the biasing influence of two leaf springs 18, one adjacent each end 4 of the stage 2, and are supported on the underside of the stage 2 and bearing on the rail 10 to bias the rail face 14 into engagement with the V-groove. The rail face 14 and V-groove 16 extend parallel to the direction of travel 20 of the stage 2 relative to the base 12. The rail face 14 may conveniently be formed by a circular rod affixed to the main structure of the rail 10. Along the second edge 8 of the stage 2, a low friction contact pad 42 is located between the stage 2 and the base 12. The low friction contact pad 42 and a biasing member 44 retain the stage 2 and the base 12 at a fixed distance from each other.

In an alternative construction, the leaf springs 18 may be replaced by a single biasing arrangement, for example, a single leaf spring centrally located between the ends 4.

In motor driven applications, stage driving lead screws would be placed adjacent the support and guide rail 10, for example, at 22 or 24, parallel to the direction of travel 20 of the stage and close enough to the rail to avoid undesired torque being applied to the rail and groove stage support and guide structure.

It will be appreciated that the orientation of the rail face 14, V-groove 16 and biasing arrangement, for example, the leaf spring(s), may be reversed from that shown in FIG. 1 and may, in fact, be any orientation of these elements which provides the desired biasing engagement of the rail 10 with the V-groove 16.

Figure 2:
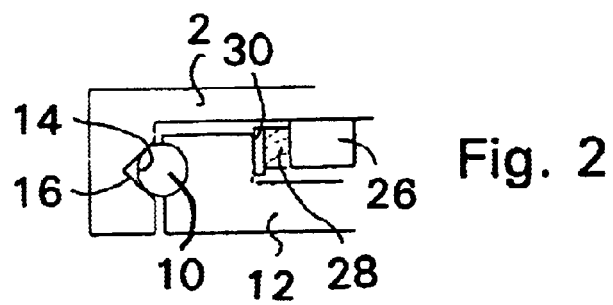
FIG. 2 is a fragmentary section of a groove and rail stage support and guide structure with a resilient block to bias the groove and rail together.

FIG. 2 illustrates a variation of FIG. 1 in which the leaf springs 18 are replaced by anchor blocks 26 which are fast with the stage 2, which provides the desired bias of rail face 14 against V-groove 16 by means of a resilient block 28 of material (i.e. synthetic rubber) and a low friction element 30 which engages the base to provide said bias.

Figure 3:
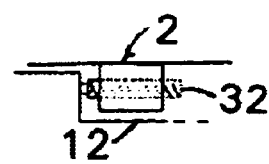
FIG. 3 is a fragmentary elevation of a ball plunger block which provides an alternative to the resilient block of FIG. 2.

FIG. 3 illustrates another variation in which a spring biased ball plunger 32 replaces each of the leaf springs.

Figure 4:
FIGS. 4 and 5 are respectively a fragmentary top view and elevation of an alternative groove and rail stage support and guide structure in which the resilient bias is provided by a leaf spring defined by a slot formed in a block.
Figure 5:
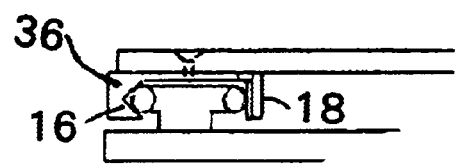

FIGS. 4 and 5 illustrate a variation in which the leaf spring(s) 18 are defined by a slot(s) 34 machined into a the captivation block(s) 36 affixed to the stage 2. The block(s) 36 also defining the V-groove 16.

Figure 6:
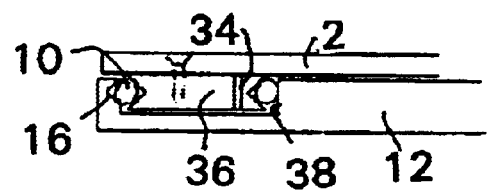
FIG. 6 is an alternative to the construction of groove and rail stage support of FIGS. 4 and 5.
Figure 7:
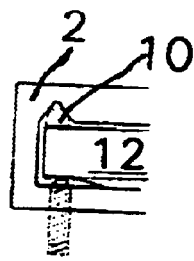
FIG. 7 illustrates one alternative orientation for the groove and rail stage support with a spring biased stage for rail engagement.

In FIG. 6, the two captivation blocks 36 are a self-contained and affixed to the stage 2, one adjacent each end 4 thereof. Here, the rail 10 consists of the V-groove 16 facing an opposing surface 38 with a spring forming slot 34 machined between the V-groove 16 and surface 38 to form a flexure to provide the aforementioned bias. FIG. 7 illustrates an alternative orientation for the groove and rail stage support with a spring biased stage for rail engagement.

Figure 8:
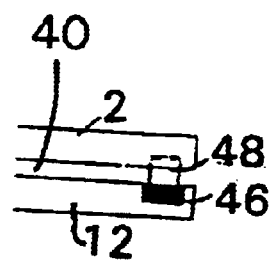
FIGS. 8, 9 and 10 are fragmentary elevations of three constructions for maintaining the edge of the stage, remote from the groove and rail structure, in contact with the base.
Figure 9:
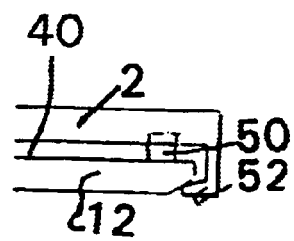
Figure 10:
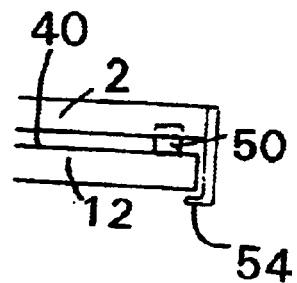

On the opposed edge 8 of the stage relative to the rail 10 the stage 2 is supported on a flat surface 40 of the base 12 and is preferably biased into contact with this flat surface 40 by the arrangement shown in FIGS. 8, 9 and 10. However, a small angular freedom of movement (see arrow 41 in FIG. 1) may be permitted to allow unconstrained, stage to surface contact.

In FIG. 8, the base is of a ferrous material or includes a strip 46 of ferrous material extending parallel to the adjacent edge 8, which attracts the stage 2 by a opposed magnet 48 (or magnets) affixed to the stage 2. Of course the strip and magnet(s) could be reversed without altering the hold-down effect.

In FIG. 9, a pad 50 (or pads) rides on the surface 40 to which it is biased by a resilient member(s) 52, which engages the underside of the base 12.

Alternatively, as shown in FIG. 10, the pad 50 may be held in place by gravity with a securing member 54 hooked under the base 12.

It will be appreciated, by those skilled in the art, that the above described preferred embodiments, which include the best mode presently known to the inventor, are illustrative only and that modifications and variations may be made without departing from the spirit and scope of the invention.

| Reference numerals |
| --- |
| 2 microscope stage |
| 4 opposed ends |
| 6 planar surface |
| 8 opposed edges |
| 10 rail |
| 12 base |
| 14 rail face |
| 16 V-groove |

| -continued |
| --- |
| Reference numerals |
| 18 leaf springs |
| 20 direction of travel |
| 22 lead screw location |
| 24 lead screw location |
| 26 anchor block |
| 28 resilient block |
| 30 low friction element |
| 32 spring biased ball plunger |
| 34 slot |
| 36 captivation block |
| 38 opposing surface |
| 40 flat surface |
| 41 angular freedom of movement of top plate |
| 42 contact pad |
| 44 biasing member |
| 46 ferrous strip |
| 48 magnet |
| 50 pad |
| 52 resilient member |
| 54 securing member |

What is claimed is:

1. A microscope stage comprising a stage supported on a base for movement relative to the base in a direction of travel, the stage having first and second opposed parallel edges extending in the direction of travel, and extending between opposed ends of the stage; the stage and base together defining a single stage support and guide structure disposed adjacent the first edge of the stage, the structure including a rail extending along the direction of travel and engaged by a guide for guiding the stage along the rail in the direction of travel, wherein the rail and guide are biased into contact with each other by a spring device and the stage is supported by the base adjacent the second edge of the stage.

2. The stage of claim 1 wherein the support and guide structure comprises the rail which defines a curved surface, elongate in the direction of travel, which engages a V-groove forming the guide which, together with the bias provided by the spring device, supports and guides the stage for said movement.

3. The stage of claim 2 wherein the spring device comprises one of: a) a leaf spring fast with the stage adjacent a center of said first edge, b) two leaf springs fast with the stage dispose one adjacent each of said opposed ends, c) a ball and plunger mounted on said stage adjacent the center of said first edge, and d) two ball and plungers mounted on said stage one adjacent each of said opposed ends.

4. The stage of claim 2 wherein the curved surface of the rail faces away from the second edge of the stage and the V-groove opens toward said second edge.

5. The stage of claim 1 wherein the spring device is at least one leaf spring defined by a slot formed in a block fast with the stage.

6. The stage of claim 1 wherein the spring device comprise at least one block fast with the stage, having a slot defining a spring and disposed between said rail and an opposed rail disposed adjacent said first edge.

7. The stage of claim 1 wherein the support of the stage on the base adjacent the second edge of the stage is enhanced by one of a) magnetic attraction, b) gravity, and c) resilient engagement of the stage with the base.

8. The stage of claim 7 wherein the support comprises a low friction pad between the stage and the base to facilitate movement of the stage relative to the base in the direction of travel.

9. The stage of claim 1 wherein a low friction pad is disposed between the spring device and the support and guide structure.

10. A microscope stage comprising a stage supported on a base for movement relative to the base in a direction of travel, the stage having first and second opposed parallel edges extending in the direction of travel, and extending between opposed ends of the stage; the stage and base together defining a single stage support and guide structure disposed adjacent the first parallel edge of the stage, the structure including a rail extending along the direction of travel and engaged by a guide for guiding the stage along the rail in the direction of travel, wherein the rail and guide are biased into contact with each other by a spring device, the stage is supported by the base adjacent the second parallel edge of the stage, and a length of the first and second parallel edges being less than the opposed ends.

* * * * *